Figure 1:
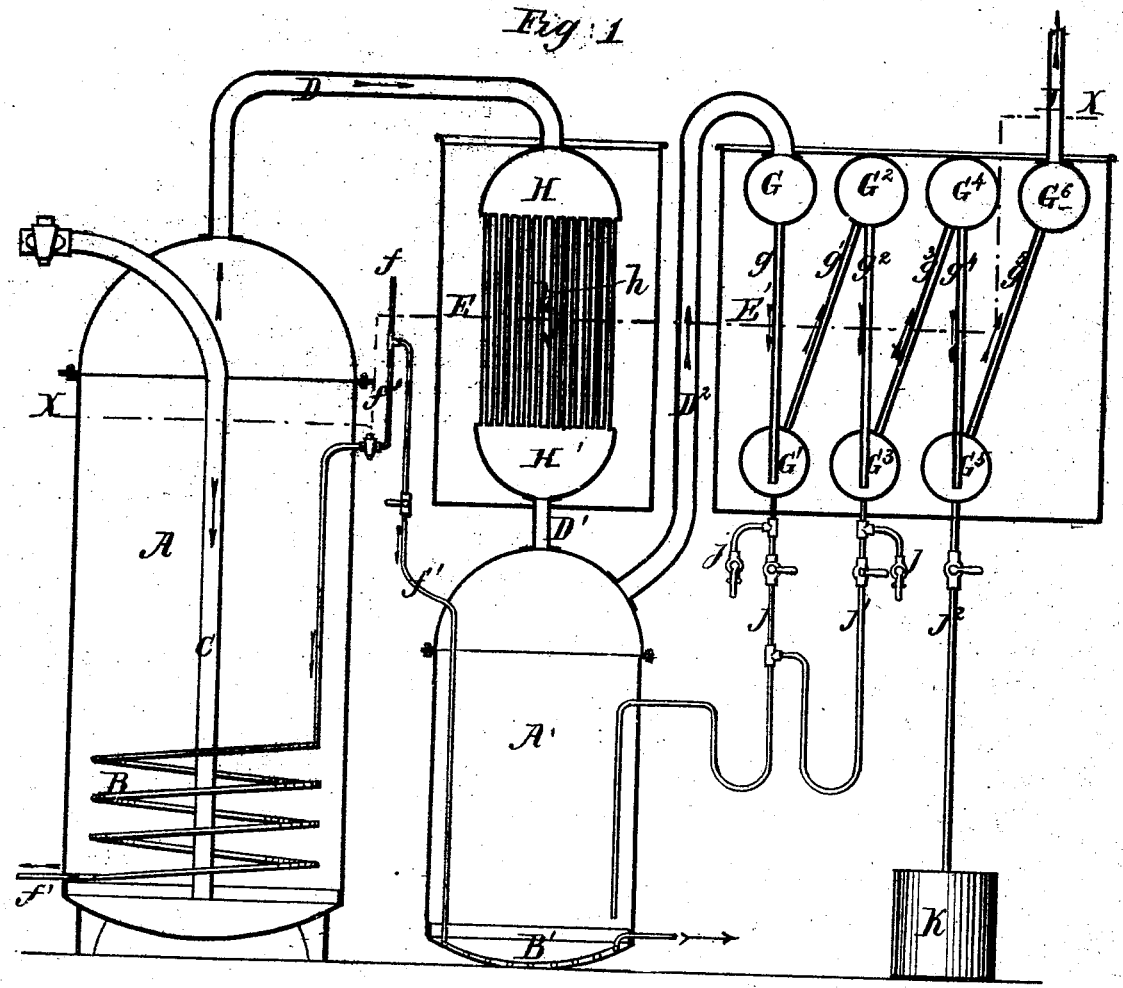

2 Sheets—Sheet 1.

G. CLARK.
DISTILLING AND TREATING ALCOHOLIC SPIRITS.

No. 96,201.          Patented Oct. 26, 1869.

Witnesses;
Edward Wilhelm
Jno. J. Bowers

Inventor,
Geo. Clark
by Forbush & Hyde
Attys

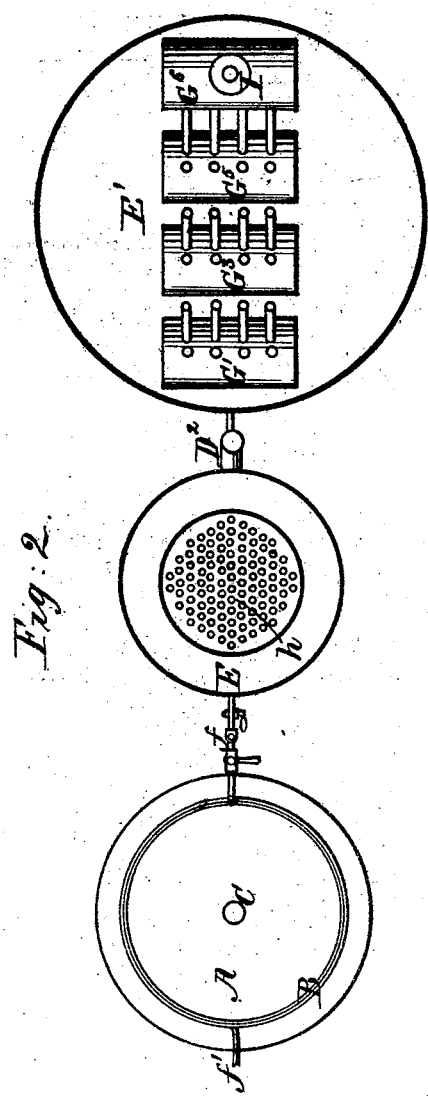

United States Patent Office.

GEORGE CLARK, OF BUFFALO, NEW YORK.

Letters Patent No. 96,201, dated October 26, 1869.

---

IMPROVEMENT IN DISTILLING AND TREATING ALCOHOLIC SPIRITS.

---

The Schedule referred to in these Letters Patent and making part of the same.

---

I, GEORGE CLARK, of the city of Buffalo, in the county of Erie, and State of New York, have invented certain new and useful Improvements in the Process of Distilling Ardent Spirits and other Liquors, and in the subsequent treatment thereof, for ripening the same, of which the following is a specification.

It is a well-known fact that the quality of wines and other liquors greatly improves, in respect to bouquet and taste, with age.

This improvement is generally conceded to be the result of the gradual evolution of certain deleterious volatile elements, which escape through the pores of the vessels in which they are contained.

The object of my invention is the more effectual removal of these objectionable substances during the process of distillation, or during a subsequent treatment of the liquor after it has been prepared, so as to leave the liquor possessing all those desirable qualities which have heretofore been acquired only by the supposed ripening effects of "old age."

Liquors have heretofore been subjected to the action of a current of air passing through them, which process, broadly, I do not claim as my invention.

My invention consists,

First, in applying an air-exhaust to the surface of the liquor thus supplied with a current of air, so as to draw the air through the liquid, which is preferably heated to a greater or less degree, whereby the vapors of the more volatile and deleterious substances contained therein are rapidly absorbed, and removed with the air, as the latter is drawn, by the action of the exhaust, through the mass of the liquid.

Second, in applying the exhaust to the end of the worm, or equivalent part of a distilling or "ageing"-apparatus, so that the air, as it escapes from the liquid in the retort, or first receptacle containing the liquor, will be drawn, with the vapors extracted therefrom, through the receivers, and into the condenser or condensers, where, in the one or the other, the different vapors are deposited, according to their volatility.

In the accompanying drawings—

Figure I represents a vertical section, and

Figure II, a horizontal section of an apparatus, such as may be used in applying my improved process.

Like letters of reference designate like parts in each of the figures.

A is a retort or vaporizing-vessel.

B, a spiral or steam-pipe therein, for heating the liquor.

C is a pipe reaching to nearly the bottom of the vessel, through which the air is introduced into the vessel. The air may be allowed to escape from the end of the pipe, or the latter may terminate in a finely-perforated coil, or equivalent device, at the bottom, so as to cause a greater diffusion of the air as it escapes therefrom into the liquid.

D is a pipe leading from the vessel A into the upper manifold H of a condenser, E.

This manifold is connected by a series of small pipes, $h$, to a similar one, H', at the bottom, which communicates, by a pipe, D¹, with a second receiving or vaporizing-vessel, A'.

A steam-coil, B', is arranged in this second vessel A'; steam to both vessels being supplied through a common pipe, $f$, and branches $f' f'$, provided with suitable stop-cocks between the two.

E' is a second condenser, and

D², a pipe leading from the vessel A' into the first manifold G, at the top therein.

G¹, G², G³, G⁴, G⁵, and G⁶, are similar manifolds, to which communication is successively had from G to the others, through the series of connecting-pipes $g, g^1, g^2, g^3, g^4, g^5$.

I is a pipe opening up from the last manifold G⁶, which communicates with a fan, or other air-exhausting device.

A pipe, J, leads from the bottom of the lower manifold G¹ into the vessel A', terminating near the bottom of the vessel, and provided with a stop-cock and a bend, forming a trap.

A similar pipe, J¹, also bent to form a trap, and provided with a stop-cock, connects the bottom of manifold G³ with the pipe J.

Each of these pipes is also provided with a faucet, $j$, whereby the condensed liquor from either or both manifolds can be drawn off or let into the vessel A', as may be required.

J² is a pipe controlled by a stop-cock leading from the manifold G⁵ into a receiver, K.

The operation of the apparatus hereinbefore described, with my improved process, is as follows:

The vessel A being nearly filled with the liquor to be treated, the exhaust is set in motion, which withdraws the air from the apparatus, and causes the air let in by turning the stop-cock of the pipe C to ascend through the liquid in the vessel A.

The temperature of the liquid being raised by radiation from the steam-pipe, the vapors evolved therein, consisting of the more volatile elements, such as ether and light acids, are readily absorbed by the air as it diffuses itself throughout the mass of the liquid, and is removed, and is carried with it through the pipe D into the condenser E.

The less volatile and more easily-condensable vapors are herein condensed, and descend to the bottom of the vessel A', where the liquid may be a second time subjected to the action of heat, whereby the vapors evolved therefrom mingle with the uncondensed vapors from the condenser E, and together are drawn by the exhaust through the pipe D² into the manifold G of the second condenser E', and thence successively through the pipes $g, g^1, g^2$, &c., into the other manifolds, in which the vapors are condensed, and run into the lower ones, $G^1$, $G^3$, and $G^5$, according to their degree of volatility.

It will thus be perceived that the vessels A A' and manifolds $G^1$, $G^3$, and $G^5$, will contain liquids varying in their specific gravity from the lowest proof in the vessel A to the highest proof in the manifold $G^5$.

In the treatment of already prepared liquors, for the purpose simply of "ageing" or maturing them, the temperature of the liquid in A should be raised only to such a degree as is necessary to facilitate the evolution and removal of the more volatile and obnoxious elements, which will be found condensed in the various vessels, as just before described, while the purified or "ripened" liquor remains in the vessel A.

For the treatment of liquors containing less volatile impurities, such as fusel-oil, a higher degree of heat should be employed, sufficient to distil the mass of the liquor, which will be condensed and deposited in the vessel A', while the oil and other less volatile ingredients only will be left in vessel A.

The more volatile elements, such as ether, acids, &c., will be found separated, according to their volatility, in the lower manifolds, from which they can be separately drawn off, as required.

The importance of my improved process has been fully demonstrated by the positive test of experiments, which has been attended with the most gratifying results, whether the *rationale* of the process has been fully explained or not.

What I claim, as my invention, is—

1. In the treatment of the various kinds of liquors, the combined application of a current of air and an exhaust, substantially in the manner and for the purposes set forth.

2. In a distilling or ageing-apparatus, consisting of two or more receivers, the combination of an air-exhaust, applied to the extremity of the worm, or equivalent part, with a current of air admitted into the first receiver, at the bottom, substantially as described.

GEORGE CLARK.

Witnesses:
A. A. MARSH,
JAY HYATT.